(12) United States Patent
Bobo et al.

(10) Patent No.: US 11,131,403 B2
(45) Date of Patent: Sep. 28, 2021

(54) REVERSIBLE BALL VALVE

(71) Applicant: NIBCO INC., Elkhart, IN (US)

(72) Inventors: David Andrew Bobo, Granger, IN (US); Daryle Shephard, Mishawaka, IN (US); Matthew J. Krazit, Goshen, IN (US); Carla M. Williamson, Niles, MI (US)

(73) Assignee: NIBCO Inc., Elkhart, IN (US)

( * ) Notice: Subject to any disclaimer, the term of this patent is extended or adjusted under 35 U.S.C. 154(b) by 0 days.

(21) Appl. No.: 16/406,555

(22) Filed: May 8, 2019

(65) Prior Publication Data

US 2020/0355294 A1    Nov. 12, 2020

(51) Int. Cl.
| | |
|---|---|
| *F16K 35/06* | (2006.01) |
| *F16K 5/06* | (2006.01) |
| *F16K 31/60* | (2006.01) |
| *F16K 27/06* | (2006.01) |

(52) U.S. Cl.
CPC ............ *F16K 35/06* (2013.01); *F16K 5/0694* (2013.01); *F16K 31/60* (2013.01); *F16K 27/067* (2013.01)

(58) Field of Classification Search
None
See application file for complete search history.

(56) References Cited

U.S. PATENT DOCUMENTS

| | | | | |
|---|---|---|---|---|
| 4,340,204 | A  * | 7/1982  | Herd | ......................... F16K 3/36 |
| | | | | 251/214 |
| 5,482,251 | A  * | 1/1996  | Roberts | ................. F16K 5/0647 |
| | | | | 251/288 |
| 6,669,171 | B1 * | 12/2003 | Stunkard | ............... F16K 5/0642 |
| | | | | 251/315.08 |
| 7,000,896 | B2 | 2/2006 | Gross | |
| 7,306,010 | B2 | 12/2007 | Gruener, Sr. | |
| 8,132,785 | B2 * | 3/2012 | Sugita | ...................... F16J 15/20 |
| | | | | 251/214 |
| 8,382,067 | B2 | 2/2013 | Xu | |
| 8,453,676 | B2 | 6/2013 | Smith et al. | |
| 9,618,126 | B1 | 4/2017 | LaCroix | |
| 10,036,481 | B2 | 7/2018 | Reck et al. | |
| 2013/0240771 | A1* | 9/2013 | Nemenoff | ............. F16K 5/0647 |
| | | | | 251/315.01 |
| 2013/0270472 | A1 | 10/2013 | Crochet, Sr. et al. | |

(Continued)

FOREIGN PATENT DOCUMENTS

| | | |
|---|---|---|
| CN | 201851771 | 6/2011 |
| CN | 202266691 | 6/2012 |

(Continued)

*Primary Examiner* — Daphne M Barry
(74) *Attorney, Agent, or Firm* — Price Heneveld LLP (57) ABSTRACT

An isolation valve has a reversible handle and multiple seals between the valve stem and valve housing. The handle includes a portion that engages a handle stop that is attached to the valve body. When the handle is reversed, the stop is moved to another handle stop opening in the valve body. Thus, the handle direction can be reversed without removal of the handle. A locking plate may be used with the isolation valve. The locking plate includes portions that engage a lock and the handle stop. When the handle direction is reversed, the locking plate can be rotated around the stem to engage the repositioned handle stop.

20 Claims, 8 Drawing Sheets

(56) References Cited

U.S. PATENT DOCUMENTS

| | | | |
|---|---|---|---|
| 2014/0021394 A1* | 1/2014 | Street | F16K 5/0657 251/315.01 |
| 2015/0101684 A1* | 4/2015 | Yoder | F16K 35/10 137/385 |
| 2015/0144208 A1* | 5/2015 | Caccavo | F16K 5/0605 137/512.2 |
| 2016/0238151 A1* | 8/2016 | Carter | F16K 5/0642 |
| 2016/0281869 A1* | 9/2016 | Smith | F16K 5/0605 |
| 2020/0049275 A1* | 2/2020 | Chen | F16K 3/314 |

FOREIGN PATENT DOCUMENTS

| | | |
|---|---|---|
| EP | 0648962 | 4/1995 |
| GB | 2347196 | 8/2000 |
| WO | 2015057610 | 4/2015 |

\* cited by examiner

REVERSIBLE BALL VALVE

BACKGROUND OF THE INVENTION

The present invention relates to ball valves and, more particularly, to a ball valve having improved stem seal function, a reversible handle, and an improved handle locking design.

Typical ball valves have a housing which includes an axially extending fluid communication path and a ball receiving chamber into which a flow diversion member, such as a ball or partial ball, is inserted. The valve body typically also has an opening extending generally orthogonally to the flow path for receiving a stem. The stem is inserted through the stem aperture and a lower end of the stem is coupled to the flow diversion member that is located in the ball receiving chamber. A locking member is typically used to secure the stem within the ball valve housing. This is typically done by having a threaded surface in the exterior of the ball valve housing that can couple with a threaded locking member that retains the stem within the ball valve housing.

The connection between the stem and the ball valve housing presents a potential fluid leak path. Therefore, a variety of seals, such as compression packing or an elastomeric seal can be used. The compression packing is compressed when the locking member is threaded onto the ball valve housing. The locking member typically requires a specific packing wrench to make packing adjustments. Typical packing nuts are small and difficult to adjust when a handle is coupled to the stem and/or when the handle is locked. Moreover, given the pressures of the fluids in the ball valve and the length of the service of the typical ball valve, leaks between the stem and ball valve housing can occur even when seals are used. This requires continuous adjustment of the packing nut, change of seals, and/or replacement of the ball valve.

Additionally, when the direction of flow is altered, and/or space is limited, it is sometimes necessary to change the position of the handle. This typically requires removal of the handle, removal of any handle locking mechanism, and repositioning of these components. This typically requires the entire system to be shut down and/or depressurized. In some cases, the repositioning is not possible and the ball valve needs to be completely replaced.

Thus, there exists a need for a ball valve which is easy to adjust, easy to lock, and easy to keep sealed.

SUMMARY OF THE INVENTION

The present invention provides an isolation valve with a valve body having a first port and a second port defining a flow channel between the first and second ports. The valve body also has a stem opening with a threaded exterior surface and a generally cylindrical interior surface. The valve body also has at least two handle stop openings. The fluid isolation valve also has a valve stem with a lower portion, a medial portion, and an upper portion. The medial portion of the stem has a plurality of seal grooves, while the upper portion is threaded. A fluid diversion device is disposed in the valve body between the first and second ports, and is coupled to the lower portion of the valve stem. Elastomeric seals are located in the plurality of seal grooves on the stem to contact the generally cylindrical interior surface of the stem opening. A threaded packing nut with a stem aperture surrounds a portion of the medial portion of the valve stem and is coupled to the threaded exterior surface of the stem opening on the valve body. A packing is located between a surface of the threaded packing nut and the stem opening on the valve body. The packing compresses when the packing nut is coupled to the threaded exterior surface of the stem opening. The handle is coupled to the upper portion of the valve stem. The handle has an end portion with two shoulders spaced apart to permit an approximate 90° rotation of the handle. A handle stop, configured to be received in one of said plurality of handle stop openings, has an upper end that extends above said handle end portion when installed in any one of the handle stop openings. The upper end of the handle stop is positioned between the shoulders on the end portion of the handle such that the handle can be rotated approximately 90° to open or close the fluid channel by movement of the fluid diversion device.

Another aspect of the present invention is a fluid isolation valve having a valve body with a flow channel, a stem opening, and a pair of handle stop openings disposed on opposite sides of the stem opening. A valve stem, having a pair of seal grooves, is connected to a flow diversion member located within the flow channel. An elastomeric seal is disposed on each of the seal grooves to provide seals between the stem and the stem opening in the valve body. A packing nut, having a stem aperture, is coupled to the stem opening of the valve body. Packing is located between the packing nut and the valve body such that it is compressed as the packing nut is coupled to the stem opening to provide a third seal between the stem and the stem opening. A handle is coupled to the valve stem and has two, spaced apart shoulders. A handle stop is received in one of the handle stop openings. The handle stop has an upper end that extends between and above said spaced apart shoulders, permitting rotation of the handle between the spaced apart shoulders to limit the travel of said fluid diversion member between a closed position and an open position. A locking plate is included between the handle and the valve body, having a notch at least partially surrounding the handle stop and an opening that surrounds at least a portion of a lock to prevent rotation of the handle when the lock is used.

Yet another aspect of the present invention is a fluid isolation valve with a valve body having a flow channel, a stem opening, and a pair of handle stop openings disposed on opposite sides of the stem opening such that the stem opening is centered between said pair of handle stop openings. The fluid isolation valve also has a valve stem that is connected to a flow diversion member located within the flow channel. A handle is coupled to the valve stem having two, spaced apart shoulders on the ends of a quadrant of a generally circular arc. The handle stop is configured to be received in the handle stop opening. The handle stop has an upper end that extends between the spaced apart shoulders permitting rotation of the handle between the spaced apart shoulders to limit the travel of the flow diversion device between an open and closed position. The handle is reversible by removing the handle stop and rotating the handle 180° and inserting the handle stop in the other handle stop opening.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in FIGS. 1-8. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
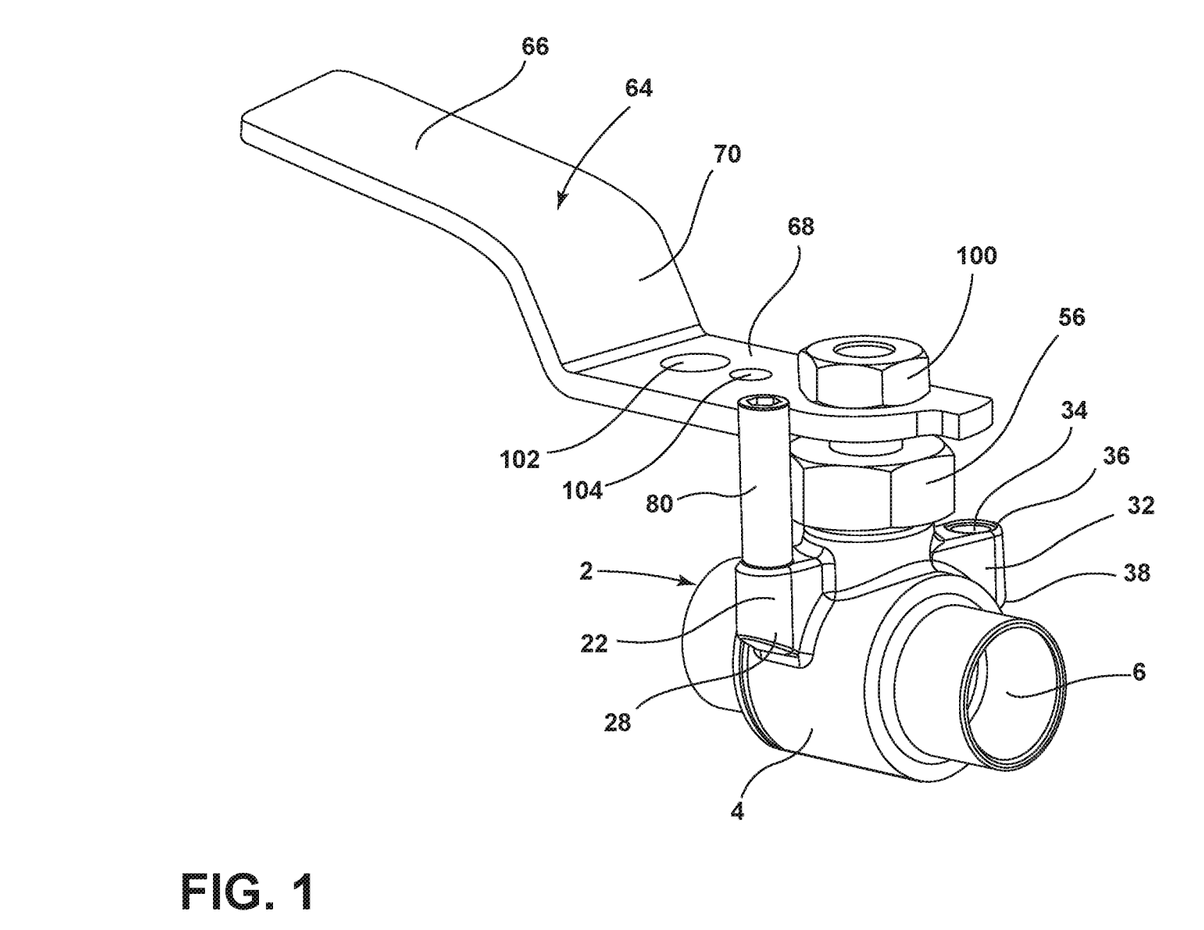
FIG. 1 is a front perspective view of one embodiment of an isolation valve consistent with the present disclosure.
Figure 2:
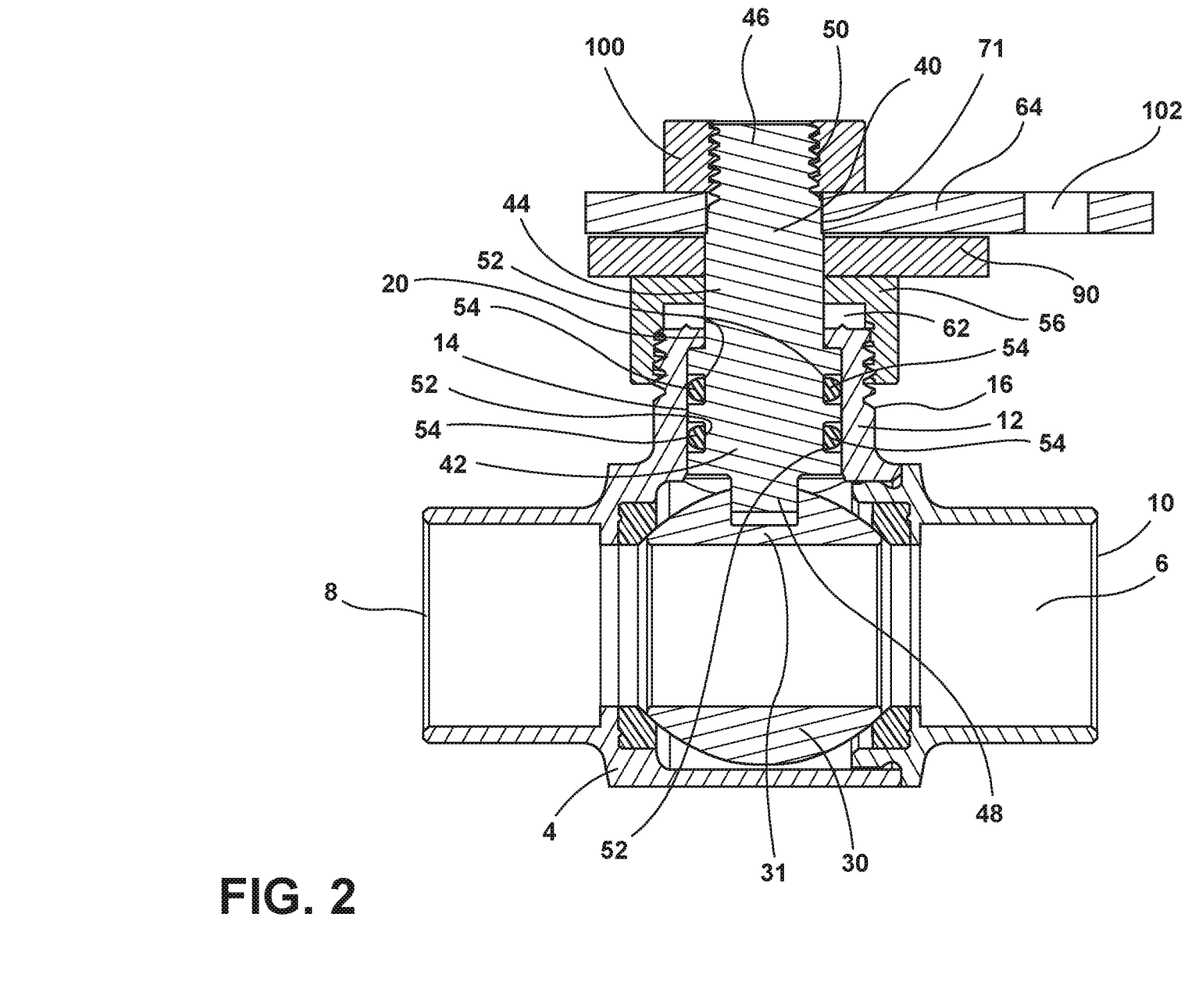
FIG. 2 is a cross-sectional view of another embodiment of the isolation valve including a locking plate.
Figure 3:
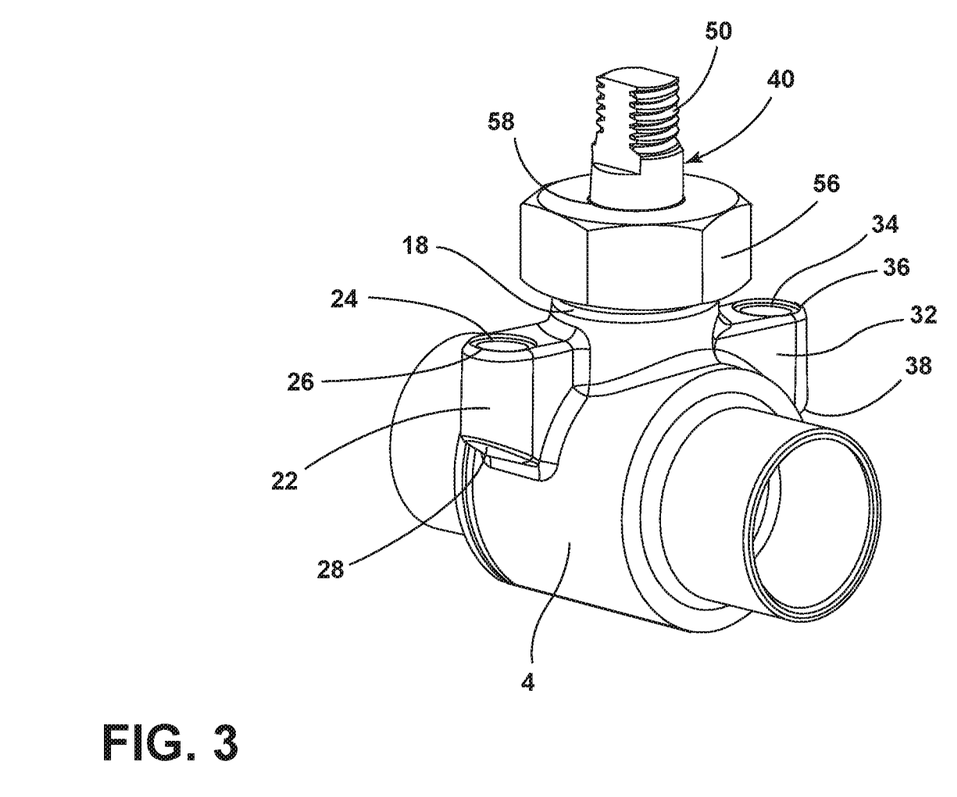
FIG. 3 is a front perspective view of the isolation valve without the handle, the handle stop, or the locking plate installed.

The present invention is generally directed to an isolation valve 2 including a valve body 4 having a first opening 8 and a second opening 10 that defines a flow channel 6. The valve body 4 can be made from any material, but is preferably made of a metal material, such as brass. The isolation valve 2 is configured to control the flow of fluids in heating and plumbing systems. FIG. 1 is a perspective view of one embodiment of the isolation valve. The isolation valve 2 has a valve body 4 with a stem opening 12. In the illustrated embodiment, the stem opening 12 has an inner surface 14 and an outer surface 16 with threading 18. The stem opening 12 also has a central aperture 20 through which a stem 40 is received.

The stem 40 includes a lower portion 42, a medial portion 44, and an upper portion 46. The lower portion 42 has a tip 48 that is received within an aperture 31 in a flow diversion member 30. The flow diversion member 30 in the illustrated example has the cross-sectional shape of a ball. The flow diversion member 30 can be rotated such that the flow channel 6 is open or can be rotated such that the flow channel 6 is closed. The rotation of the flow diversion member 30 is achieved by rotation of the stem 40.

The valve body 4 also includes two handle stop openings 22, 32 that are on opposite sides of the stem opening 12, as illustrated in FIGS. 1 and 3-6. The first handle stop opening 22 includes a central aperture 24 with a threaded surface 26. The first handle stop opening 22 extends from an angled post 28 extending from the valve body 4. Similarly, the second handle stop opening 32 has a central aperture 34 with a threaded surface 36. The second handle stop opening 32 also extends from an angled post 38 on valve body 4.

A packing nut 56 is utilized to couple the stem 40 to the stem opening 12 of the valve body 4. The packing nut 56 includes a central aperture 58 and a threaded surface (not shown in the drawings). The threaded surface of the packing nut 56 is threaded onto the external threading 18 of the stem opening 12 on the valve body 4. In the illustrated embodiment, the packing nut 56 is large and has easily accessible wrench flats so that an open-end or standard adjustable jaw wrench can quickly make necessary adjustments without removing the valve handle 64. A packing 62 is located between the top of the stem opening 12 and the inside surface of the packing nut 56. The packing 62 can be a polymeric material such as polytetrafluoroethylene. The threading of the packing nut 56 onto the stem opening 12 compresses the packing 62 to provide a seal between the stem 40 and the valve body 4.

In the illustrated embodiment, the stem 40 has two seal grooves 52. The seal grooves 52 receive elastomeric seals 54 to create seals between the body of the stem 40 and the inner surface 14 of the stem opening 12. In the illustrated embodiment, the elastomeric seals 54 are rubber O-rings that are slightly compressed to create seals between the stem 40 and the valve body 4. Thus, in the illustrated embodiment, there are three seals for preventing leakage between the stem 40 and the valve body 4, namely: the two elastomeric seals 54 and the compressed packing 62.

The handle 64 includes an upper portion 66, a lower portion 68, and a transition portion 70 therebetween. In the illustrated embodiment, the transition portion 70 is angled. The upper portion 66 of the handle 64 is designed to be manually actuated by a user to control the flow of fluids within flow channel 6. The lower portion 68 includes a stem aperture 71 that surrounds the stem 40. The lower portion 68 of the handle 64 includes a first shoulder 72 and a second shoulder 74 with a generally circular surface 76 therebetween. The first shoulder 72 and second shoulder 74 are spaced apart to permit rotation of the handle 64 approximately 90°, as described below. Thus, the generally circular surface 76 generally represents a quarter of a circle, i.e., a quadrant of the circumferential surface of a circle to permit such rotation.

Figure 4:
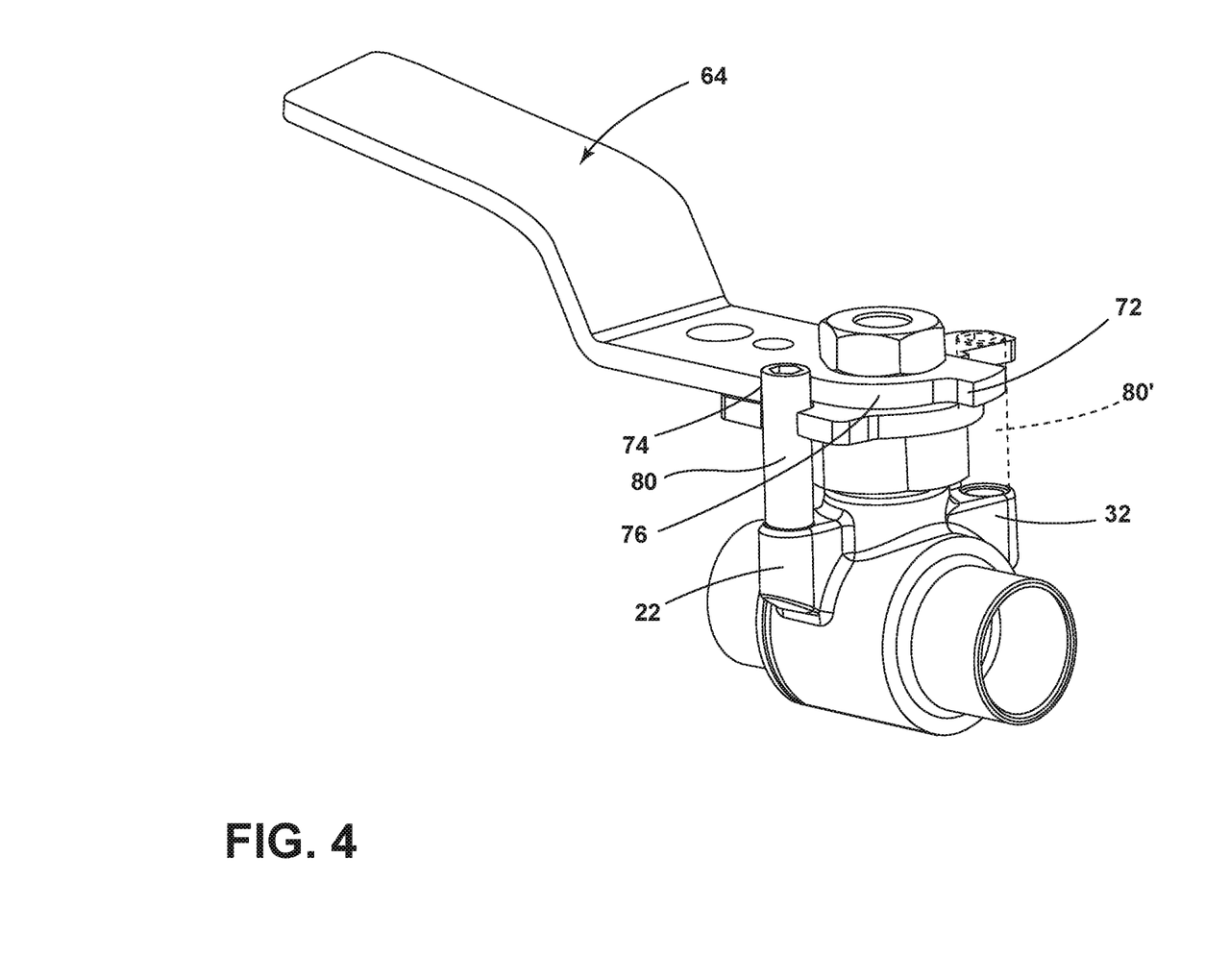
FIG. 4 is a front perspective view of the isolation valve shown in FIG. 1 with the addition of a locking plate, illustrating one location for the handle stop.
Figure 5:
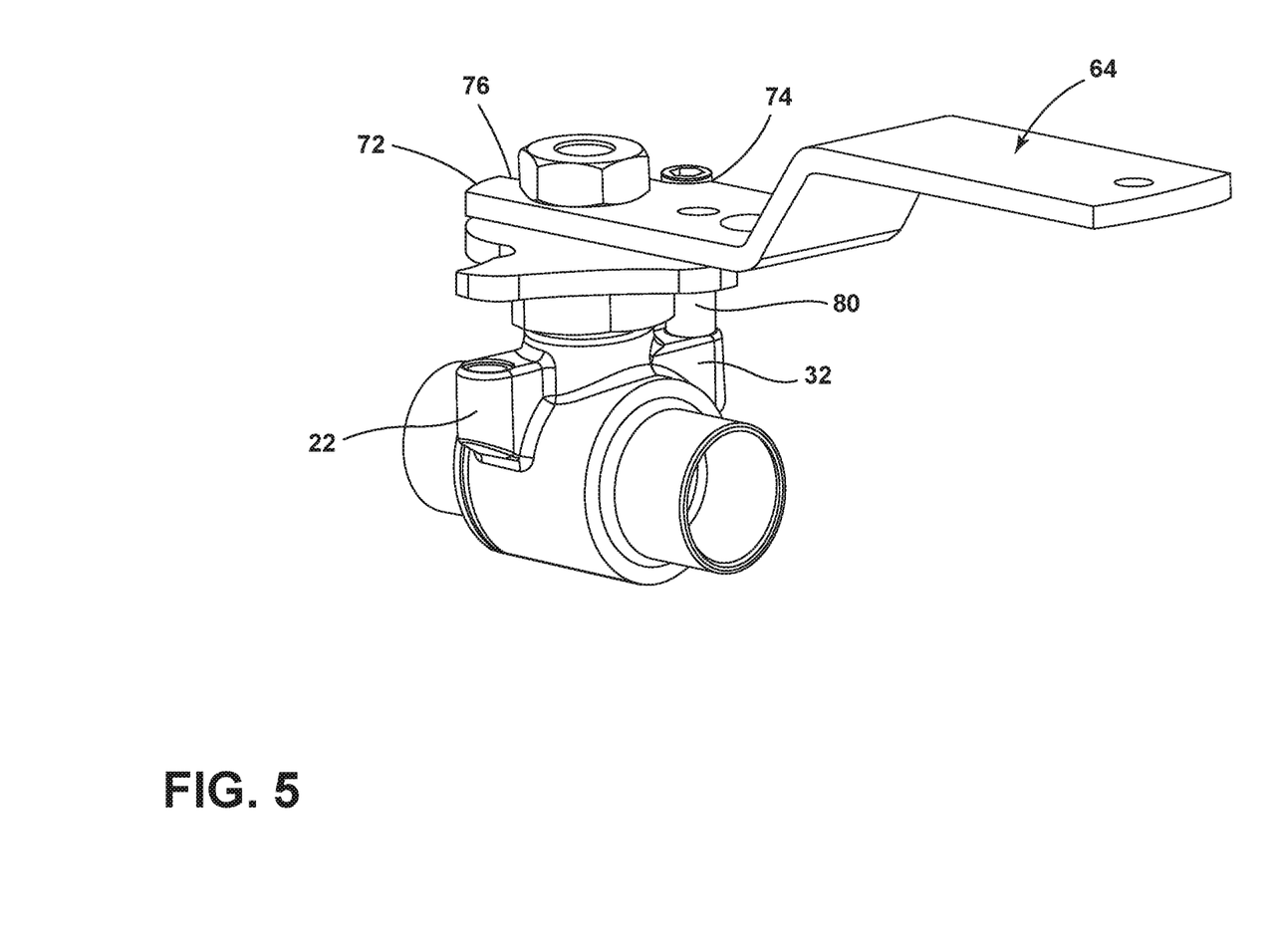
FIG. 5 is a perspective view of the isolation valve shown in FIG. 4, with the handle direction and the handle stop reversed.
Figure 6:
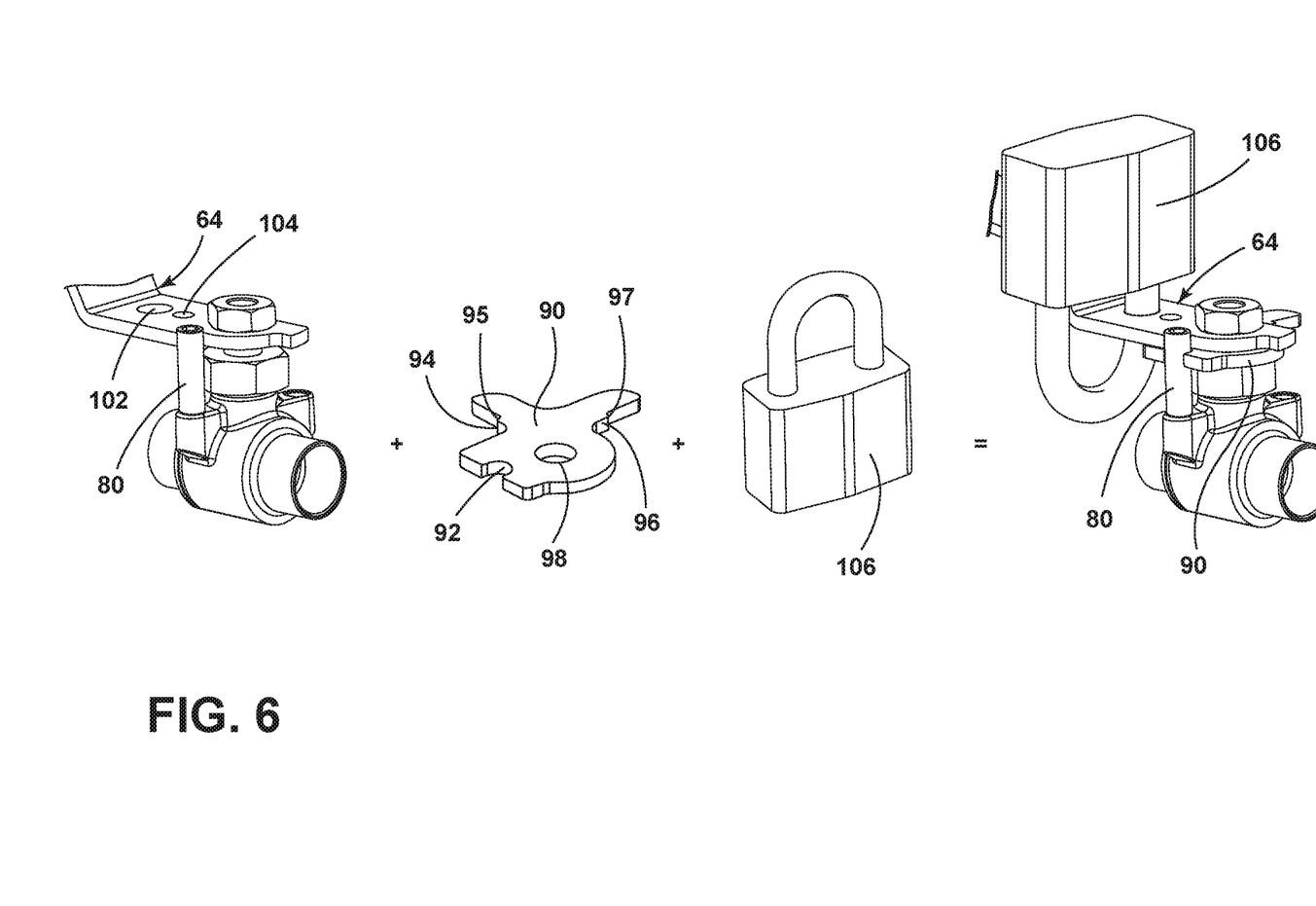
FIG. 6 is a perspective view of the assembly of the components utilizing a lock and a locking plate with the isolation valve shown in FIGS. 1-5.
Figure 7:
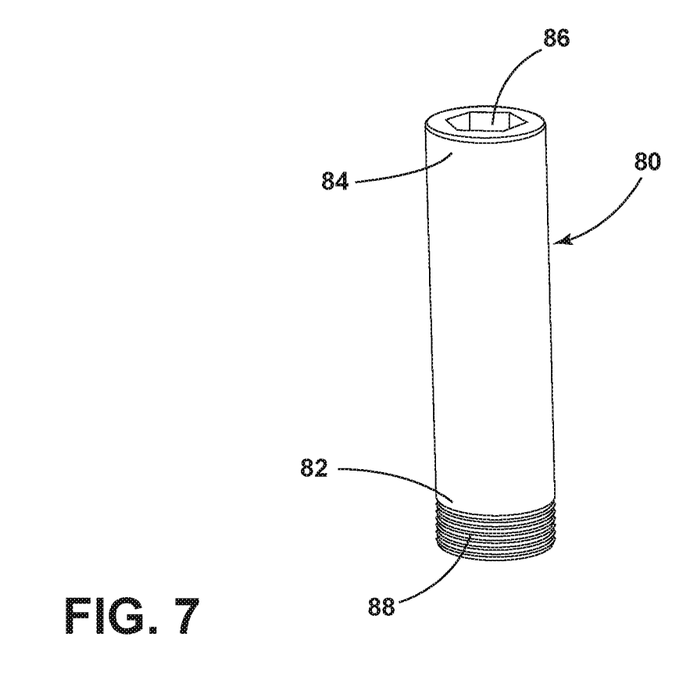
FIG. 7 is a perspective view of the handle stop used with the isolation valve.
Figure 8:
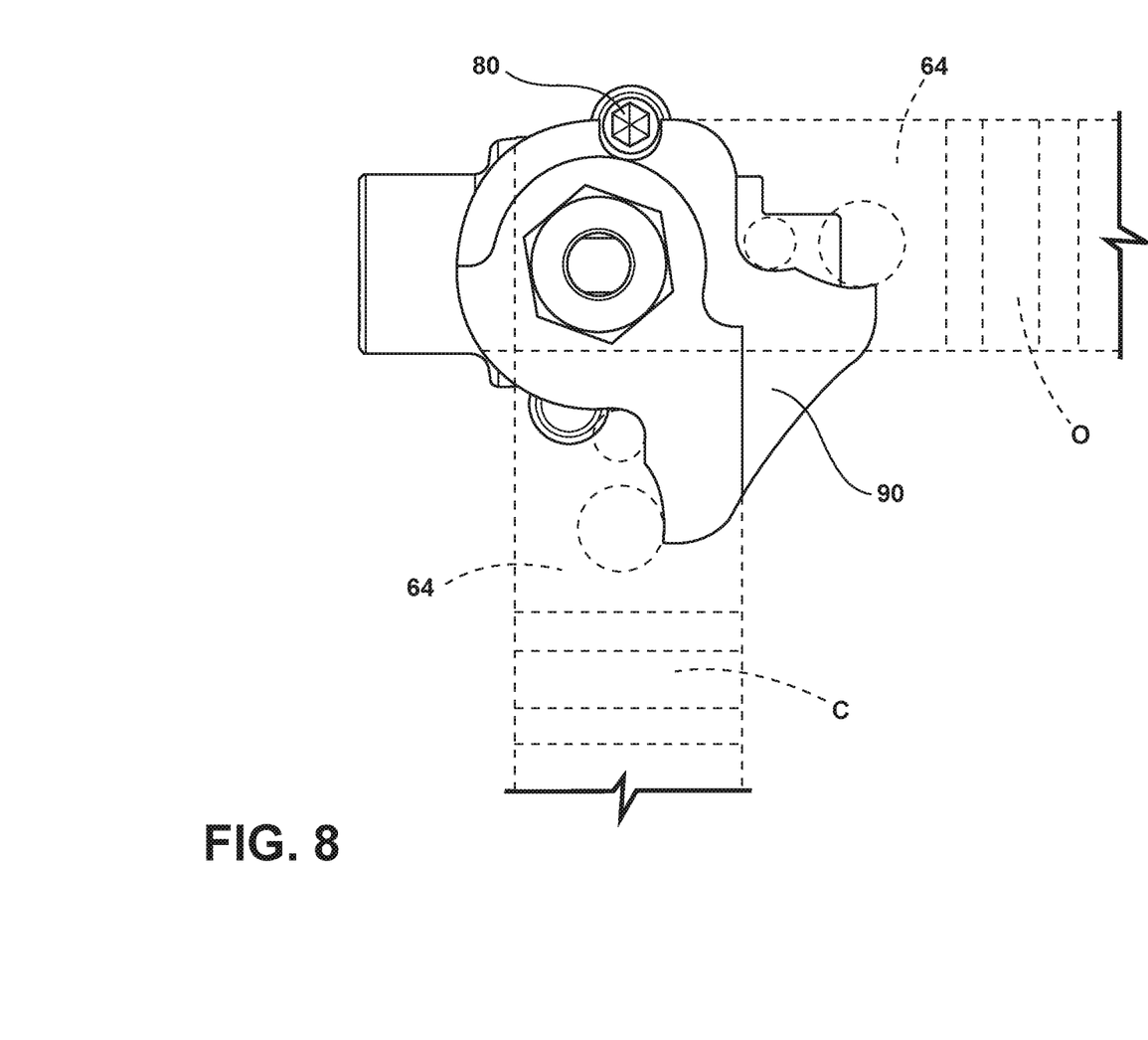
FIG. 8 is a top perspective view of the locking plate showing the handle in a locked open position and a lock closed position.

Handle stop 80 includes a lower portion 82 and an upper portion 84. The lower portion 82 includes a threaded surface 88 that is received within the threaded surface 26 of the first handle stop opening 22 or the threaded surface 36 of the second handle stop opening 32, depending upon which handle stop opening 22, 32 is being coupled with the handle stop 80. The upper portion 84 of the handle stop 80 includes a hex-keyed surface 86 to permit installation and/or removal of the handle stop 80 from either the first handle stop opening 22 or the second handle stop opening 32. While the illustrated embodiment shows the hex-keyed surface 86 as an opening, it could also be another shaped surface, or even on the exterior surface on the handle stop 80. The handle stop 80 extends vertically such that when the handle 64 is installed, the handle stop 80 will be positioned between the first shoulder 72 and the second shoulder 74 on the handle 64. This permits the rotation of the handle 64 approximately 90° to permit the opening and closing of the flow channel 6. When the handle 64 needs to be moved, or the direction of flow needs to be switched, the handle 64 can be rotated 180°, as illustrated in FIGS. 4 and 5, showing the handle stop 80 in an installed position and a potential position 80'.

In order to achieve the reversal of the handle 64, the handle stop 80 is removed from the first handle stop opening 22. The handle 64 is then rotated 180°. The handle stop 80 is then inserted into the second handle stop opening 32 thereby engaging the first shoulder 72 and second shoulder 74, which are now located on the opposite side of the valve body 4 after the handle 64 has been rotated 180°. In this manner, the handle 64 can be reversed without removal of the handle 64. While the illustrated embodiments illustrate the use of a single handle stop 80, multiple handle stops 80 could be used. Indeed, the valve body 4 could have more than two handle stop openings 22. Moreover, each of the two handle stop openings 22, 32 in the illustrated examples could have a handle stop 80 installed which could result in both handle stops 80 contacting surfaces on the handle 64.

As illustrated in some of the embodiments (FIGS. 2, 4-8), a locking plate 90 can be used to assist with the locking of the valve 2 to prevent inadvertent actuation of the valve 2. The locking plate 90 has a notch 92 that surrounds a portion of the handle stop 80. In addition, the locking plate 90 has locking notches 94, 96, which will permit the handle 64 to be locked in an open O or closed C position. Locking plate 90 further includes a central aperture 98 to go over a portion of the stem 40. When the locking plate 90 is used, the locking plate 90 is positioned between the packing nut 56 and the lower portion 68 of handle 64, as illustrated in FIGS. 4 and 5. When the handle 64 is reversed, the locking plate 90 can be rotated 180° to partially surround the repositioned handle stop 80.

When a lock 106 is used, lock 106 will be received through at least hole 102 in the lower portion 68 of handle 64, while engaging one of the locking notches 94 or 96. If the smaller lock 106 is used, the smaller hole 104 can be used to lock the handle 64 in place. Alternatively, the lock 106 could be received through both locking holes 102, 104. The locking notches 94, 96 each have a shoulder 95, 97 to accommodate the use of the different sized locking holes 102, 104 in the handle 64.

As illustrated in FIG. 1, a handle nut 100 is received on the very top of the threaded portion 50 of the stem 40 to secure the handle 64 to the stem 40 whether or not the locking plate 90 is used.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A fluid isolation valve, comprising:
   a single piece valve body having a first port and a second port defining a flow channel between said first and second ports, said valve body further including:
   a stem opening with a threaded exterior surface and a cylindrical interior surface; and
   a pair of handle stop openings in said valve body with central portions that align with and are positioned on opposite sides of said stem opening such that the aligned central portions of the pair of handle stop openings are perpendicular to the centerline of said flow channel;
   a valve stem having a lower portion, a medial portion, and an upper portion;
   said medial portion having a plurality of seal grooves, and said upper portion having a threaded portion;

a flow diversion device, disposed in the valve body between said first and second ports, said flow diversion device being coupled to said lower portion of said valve stem;
a plurality of elastomeric seals located in said plurality of seal grooves to contact said cylindrical interior surface of said stem opening;
a threaded packing nut with a stem aperture that surrounds a portion of said medial portion of said valve stem when said threaded packing nut is coupled to said threaded exterior surface of said stem opening on said valve body;
a packing, located between a surface of said threaded packing nut and said stem opening on said valve body, that is compressed as the packing nut is coupled to said threaded exterior surface of said stem opening;
a handle having a lower portion and an upper portion, said lower portion including a front edge portion, a stem opening disposed rearward of said front edge portion, and side edges disposed to the lateral sides of said stem opening;
wherein said stem opening of said handle receives a portion of said upper portion of said valve stem;
wherein said handle has a shoulder formed on said front edge portion of said handle and a shoulder formed on one of said side edges of said handle adjacent to said stem opening;
a handle stop configured to be received in one of said plurality of handle stop openings, said handle stop having an upper end extending above an end portion of said handle when installed in any of said plurality of handle stop openings; and
wherein when said upper end of said handle stop is positioned between said shoulders on said end portion of said handle, the handle can be rotated to open or close the flow channel by movement of said flow diversion device, with the handle stop contacting a surface of said shoulder on said side edge of said handle when said lower portion and said upper portion of said handle are aligned with said centerline of said flow channel and said handle stop contacting a surface of said shoulder on said front edge of said handle when said lower portion and said upper portion of said handle are perpendicular to said centerline of said flow channel.

2. The fluid isolation valve of claim 1, further including a locking plate with a stem aperture, and a handle stop opening that surrounds at least a portion of said handle stop.

3. The fluid isolation valve of claim 2, wherein said locking plate includes two lock openings spaced apart to permit locking of the handle in an open or closed position.

4. The fluid isolation valve of claim 3, wherein said handle stop opening and said two lock openings are notches in said locking plate.

5. The fluid isolation valve of claim 3, wherein said lower portion of said handle includes one or more lock openings disposed rearward of said stem opening in said handle.

6. The fluid isolation valve of claim 2, wherein said packing is a polymeric material.

7. The fluid isolation valve of claim 1, wherein said plurality of elastomeric seals is two rubber O-rings.

8. The fluid isolation valve of claim 1, wherein said handle stop includes a lower threaded end and a hex-shaped upper end to permit installation and removal of said handle stop in said handle stop openings using a hex key.

9. A fluid isolation valve, comprising:
a single piece valve body having a flow channel, a stem opening, and a pair of handle stop openings disposed on opposite sides of said stem opening with central portions that are aligned with the center of said stem opening;
a valve stem having a pair of seal grooves;
a flow diversion member, located within said flow channel and connected to a portion of said valve stem that is rotatably movable between a closed portion and an open position;
an elastomeric seal disposed in each of said seal grooves to provide seals between said valve stem and said stem opening in said valve body;
a packing nut, having a stem aperture, coupled to the stem opening of said valve body;
packing that is located between said packing nut and said valve body that is compressed as the packing nut is coupled to said stem opening to provide a third seal between the stem and the stem opening;
a handle having a lower portion and an upper portion, said lower portion including a front edge portion, a stem opening disposed rearward of said front edge portion, and side edges disposed to the lateral sides of said stem opening;
wherein said stem opening of said handle receives a portion of an upper portion of said valve stem;
wherein said handle has a shoulder formed on said front edge portion of said handle and a shoulder formed on one of said side edges of said handle adjacent to said stem opening;
a handle stop configured to be received in the handle stop openings, said handle stop having an upper end that extends between said shoulders on said handle, permitting rotation of said handle between said shoulders to move said flow diversion member between the open position and the closed position, with the handle stop contacting a surface of said shoulder on said side edge of said handle when said lower portion and said upper portion of said handle are aligned with said centerline of said flow channel and said handle stop contacting a surface of said shoulder on said front edge of said handle when said lower portion and said upper portion of said handle are perpendicular to said centerline of said flow channel; and
a locking plate having an opening that receives a portion of said upper portion of said valve stem, a notch having a one-half of the circumference of a circle shape, at least partially surrounding said handle stop, and an opening that surrounds at least a portion of a lock to prevent rotation of said handle when locked.

10. The fluid isolation valve of claim 9, wherein said locking plate includes two locking notches that will permit the handle to be locked in the open or closed position, with a portion of the lock contacting one notch when the handle is locked in the open position and the other notch when the handle is locked in the closed position.

11. The fluid isolation valve of claim 9, wherein said packing is polytetrafluoroethylene.

12. The fluid isolation valve of claim 9, wherein said elastomeric seals are rubber O-rings.

13. The fluid isolation valve of claim 9, further including a handle nut that couples to said valve stem above said handle and said locking plate.

14. The fluid isolation valve of claim 13, wherein said handle stop extends above the locking plate and the handle.

15. The fluid isolation valve of claim 9, wherein said handle includes an angled transition portion between said upper portion and lower portion.

16. The fluid isolation valve of claim 9, wherein a spaced apart shoulders on said handle include a generally curved surface therebetween shaped as one fourth of the circumference of a circle.

17. A fluid isolation valve, comprising:
a single piece valve body having a flow channel, a stem opening, and a pair of handle stop openings disposed on opposite sides of said stem opening, such that said stem opening is centered between said pair of handle stop openings with the centers of the stem opening and handle stop openings in alignment;
a valve stem;
a flow diversion member located within said flow channel and coupled to a portion of said valve stem such that said flow diversion member is rotatably movable between a closed position and an open position;
a handle having a lower portion and an upper portion, said lower portion including a front edge portion, a stem opening disposed rearward of said front edge portion, and side edges disposed to the lateral sides of said stem opening;
wherein said stem opening of said handle receives a portion of an upper portion of said valve stem;
wherein said handle has a shoulder formed on said front edge of said handle and a shoulder formed on one of said side edges of said handle adjacent to said stem opening;
a handle stop configured to be received in a handle stop opening, said handle stop having an upper end that extends between said shoulders on said handle, permitting rotation of said handle between said shoulders to move said flow diversion member between a closed position and an open position, with the handle stop contacting a surface of said shoulder on said side edge of said handle when said lower portion and said upper portion of said handle are aligned with a centerline of said flow channel and said handle stop contacting a surface of said shoulder on said front edge of said handle when said lower portion and said upper portion of said handle are perpendicular to the centerline of said flow channel; and
wherein said handle is reversible by removing said handle stop, rotating said handle 180°, and inserting said handle stop in the other handle stop opening.

18. The fluid isolation valve of claim 17, wherein said stem has a pair of spaced apart seal grooves.

19. The fluid isolation valve of claim 17, further including a locking plate positioned between said handle and said valve body with an opening that surrounds at least a portion of said handle stop.

20. The fluid isolation valve of claim 19, wherein said locking plate includes a pair of spaced apart locking notches to permit locking of the handle in the open or closed position.

* * * * *